Dec. 1, 1931. P. B. CAMP 1,834,088
SLACK ADJUSTER FOR RAILWAY CAR BRAKES
Original Filed Aug. 21, 1929
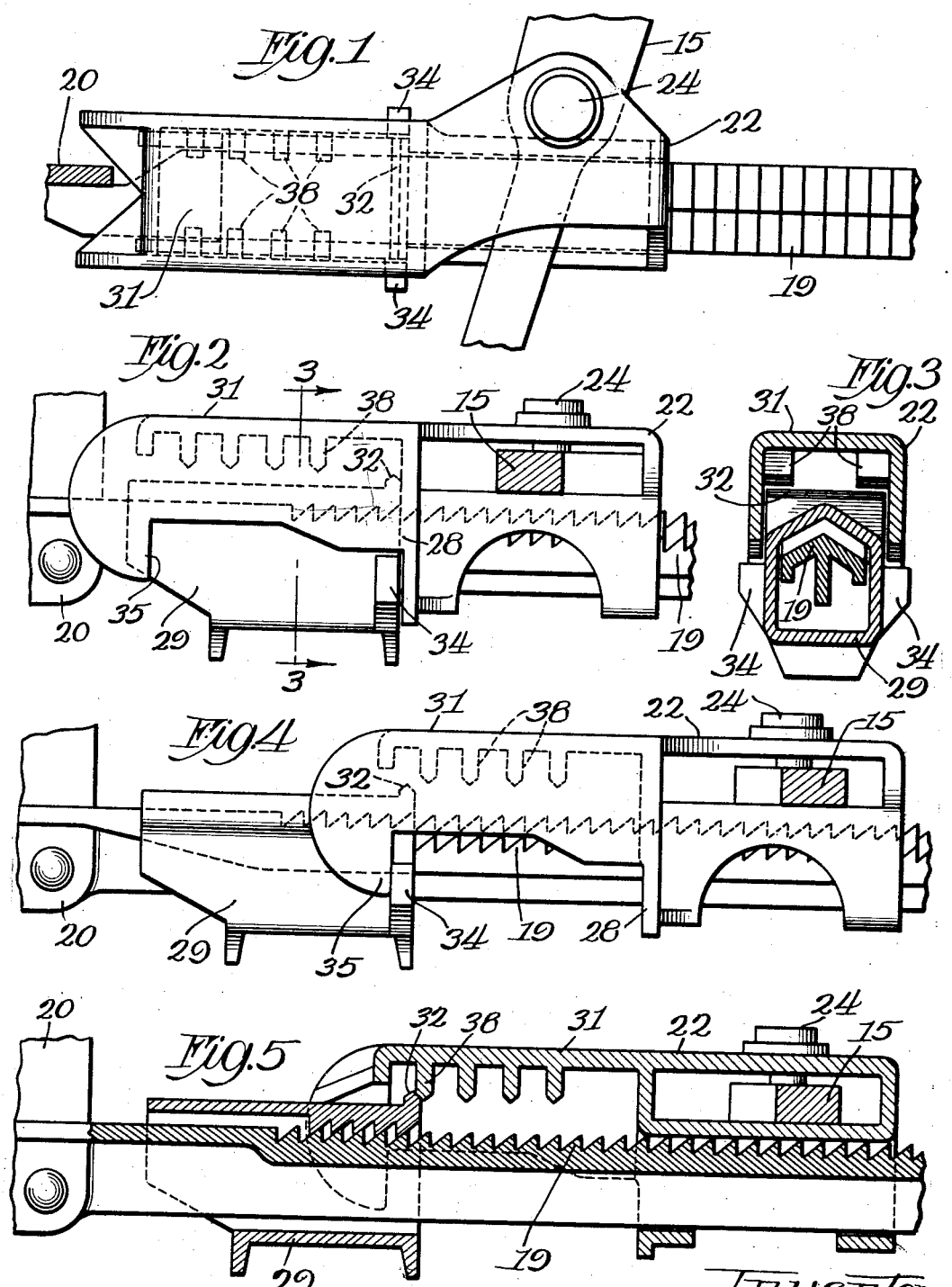

Patented Dec. 1, 1931

1,834,088

UNITED STATES PATENT OFFICE

PERCY B. CAMP, OF CHICAGO, ILLINOIS, ASSIGNOR TO UNIVERSAL DRAFT GEAR ATTACHMENT CO., A CORPORATION OF ILLINOIS

SLACK ADJUSTER FOR RAILWAY CAR BRAKES

Application filed August 21, 1929, Serial No. 387,388. Renewed February 27, 1931.

The invention relates to slack adjusters of the type in which a movable fulcrum block for one of the brake levers may be shifted to take up abnormal slack and reanchored in its new position.

The object of the invention is to prevent the reanchoring of the fulcrum element in such position as to provide for less than normal brake clearance.

While the invention may take on various forms, especially to adapt it for use in connection with different forms of adjusting devices, it is herein disclosed in connection with a slack adjuster of the form described in my pending application for patent, Serial No. 336,071, filed January 30, 1929.

In the accompanying drawings:

Fig. 1 is a detail plan view of the device;
Fig. 2 is a detail side elevation thereof, partly in section;
Fig. 3 is a sectional view on the line 3—3 of Fig. 2;
Figs. 4 and 5 are views similar to Fig. 2, with the parts in different positions.

The slack adjuster in connection with which the invention is disclosed, comprises generally a ratchet bar 19 which is fixed to the car frame, as indicated at 20; a fulcrum block 22 freely slidable upon the bar; a brake lever 15, pivoted to the block as indicated at 24; a buttress 29 riding upon the bar 19 and having teeth cooperating with the teeth thereof and being enclosed between oppositely facing shoulders or lugs 28, 35, on the fulcrum block, spaced to correspond with the normal slack of the brake system. When the brakes are released the shoulder 28 is in engagement with the rearward end of the buttress. Brake setting stresses urge the fulcrum block forwardly, that is, to the left, as the device is illustrated, and the buttress serves as a positive stop for it and, the brakes being unworn the setting operation requires no more than the desired range of movement of the brake cylinder piston. As the brake shoes wear away there is required, of course, a greater movement to bring them into contact with the wheels and readjustment of the brake mechanism becomes necessary.

In the device herein disclosed such readjustment is accomplished, as fully explained in the specification of the pending application above referred to, by manually swinging the lever 15 to the right until this movement is arrested by the engagement of the shoes with the wheels. The fulcrum block 22 is, of course, carried to the right with the lever and its shoulders 35 come into engagement with shoulders 34 on the buttress 29 and at its rearward end when the movement corresponds with the normal brake slack of the system, and further movement corresponds with the excess and undesirable brake slack which has been developed by wear. As the buttress is moved to the right its teeth click over the teeth of the bar and anchor it in its new position. Upon release of the lever 15 the brake shoes recede from the wheels, and the fulcrum block is carried to the left until its shoulders 28 engage the rearward end of the buttress. The normal brake setting action is now provided for and maintained until further wearing away of the faces of the shoes occurs.

In making the above described readjustment an inexperienced man, or one having an excess of zeal, may be tempted to manually shift the buttress still further to the right after the lever has reached the limit of its movement in that direction. By doing so he will have decreased the distance between the rear end of the buttress and the shoulders 28 and full release of the brakes will be prevented.

It is the purpose of the present invention to render such over adjustment impossible, and while the invention is illustrated in connection with the particular form of adjusting mechanism disclosed in my said application, it is applicable to other forms of the same general type.

In incorporating the invention into the adjusting mechanism disclosed there is formed upon the forward extension 31 of the fulcrum block 22 a longitudinally arranged series of depending fingers 38 of sufficient length to form an obstruction to the backward movement of the buttress independently of the fulcrum block if the teeth of the latter are lifted entirely out of engagement with the teeth of the bar. An upstanding lug 32 is provided at the rearward end of the buttress which, as shown in Fig. 5, will be brought into engagement with one of the fingers 38 if an attempt is made to manually shift the buttress independently of the fulcrum block.

I claim as my invention:

1. A slack adjuster for car brake systems comprising a bar having a series of ratchet teeth on its upper face, a fulcrum block slidably mounted on the bar, means for pivotally attaching a brake lever to the fulcrum block, a buttress mounted upon the bar and having ratchet teeth cooperating with the teeth thereof and being engageable by the fulcrum block on brake applications, detents on the fulcrum block for preventing independent readjustment of the buttress.

2. A slack adjuster for car brake systems comprising a fixed bar having ratchet teeth on its upper face, a fulcrum block slidably sleeved upon the bar and having forwardly facing shoulders, and an extension projecting forwardly from such shoulders and having at its forward end a pair of depending backwardly facing shoulders, a buttress mounted upon and cooperating with the teeth of the bar and being engageable with the fulcrum block, and having a pair of lateral projecting forwardly and upwardly facing shoulders at its rearward end engageable by the depending shoulders of the fulcrum block extension, a lug projecting upwardly from the rear end of the buttress and a series of longitudinally disposed fingers projecting downwardly from the extension and engageable with the lug before the ratchet teeth of the buttress and bar become disengaged.

3. A slack adjuster for car brake systems comprising a bar having a series of ratchet teeth on its upper face, a fulcrum block slidably mounted on the bar, means for pivotally attaching a brake lever to the fulcrum block, a buttress mounted upon the bar, and having ratchet teeth cooperating with the teeth thereof and being engageable by the fulcrum block on brake applications, lug means carried by the fulcrum block for moving the buttress backwardly on the bar, and means for preventing movement of the buttress independently of the fulcrum block.

4. A slack adjuster for car brake systems comprising a bar having a series of ratchet teeth on its upper face, a fulcrum block slidable upon the bar, means for pivoting a brake lever to such block, a buttress mounted upon the bar and having teeth engageable with the teeth thereof and forming a limiting stop for the fulcrum block when under brake application stresses, a forwardly facing lug carried by the buttress, a backwardly facing lug carried by the fulcrum block for engaging the first named lug, such cooperating lugs being normally spaced apart a distance corresponding with normal brake slack, and means rendering the buttress incapable of adjustment to lock the fulcrum block at less than normal brake slack position.

5. A slack adjuster for car brake systems comprising a bar having a series of ratchet teeth on its upper face, a fulcrum block slidable upon the bar, means for pivoting a brake lever to such block, a buttress mounted upon the bar and having teeth engageable with the teeth thereof and forming a limiting stop for the fulcrum block when under brake application stresses, a forwardly facing lug carried by the buttress, a backwardly facing lug carried by the fulcrum block for engaging the first named lug, such cooperating lugs being normally spaced apart a distance corresponding with normal brake slack, means carried by the fulcrum block for locking the buttress in engagement with the bar, and means for preventing movement of the buttress independently of the fulcrum block.

In testimony whereof I affix my signature.

PERCY B. CAMP.